United States Patent
Ito

(10) Patent No.: US 7,253,925 B2
(45) Date of Patent: Aug. 7, 2007

(54) SYSTEM AND METHOD FOR PERFORMING HALFTONE PROCESSING OF COLOR AND MONOCHROME DATA

(75) Inventor: Shinsaku Ito, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1071 days.

(21) Appl. No.: 10/379,995

(22) Filed: Mar. 6, 2003

(65) Prior Publication Data

US 2004/0174565 A1   Sep. 9, 2004

(51) Int. Cl.
  H04N 1/405  (2006.01)
  H04N 1/407  (2006.01)
  H04N 1/52   (2006.01)
  H04N 1/60   (2006.01)

(52) U.S. Cl. .............. 358/1.9; 358/2.1; 358/3.03; 358/504; 358/519; 358/535

(58) Field of Classification Search .............. 358/1.9, 358/2.1, 3.03–3.06, 3.13, 3.24, 504, 534–536, 358/518–519, 521, 406, 3.21

See application file for complete search history.

(56) References Cited

U.S. PATENT DOCUMENTS 6,026,216 A * 2/2000 Ohtsuka et al. .............. 358/1.9

2005/0094170 A1 * 5/2005 Ichitani ....................... 358/1.9

FOREIGN PATENT DOCUMENTS

| JP | 10-124276 A   | 5/1988 |
| JP | 2000-78400 A  | 3/2000 |
| JP | 2000-187368 A | 7/2000 |
| JP | 2000-188685 A | 7/2000 |
| JP | 2001-63191 A  | 3/2001 |

* cited by examiner

*Primary Examiner*—Scott Rogers
(74) *Attorney, Agent, or Firm*—Foley & Lardner LLP

(57) ABSTRACT

A system and method for creating gamma correction data for a hardcopy device includes generating a data pattern, the data pattern including data representing color pixels and monochrome pixels, dithering the color pixels of the data pattern, and error diffusing the monochrome pixels of the data pattern such that the dithered color pixels and the error diffused monochrome pixels are each N-bit values, N being greater than one. A test pattern is generated based on the dithered color pixels and the error diffused monochrome pixels. The test pattern is scanned into scanned image data, and a plurality of color gamma correction curves and a monochromatic gamma correction curve are generated from the scanned image data.

30 Claims, 4 Drawing Sheets

SYSTEM AND METHOD FOR PERFORMING HALFTONE PROCESSING OF COLOR AND MONOCHROME DATA

FIELD OF THE INVENTION

The present invention relates generally to image processing, and more particularly to a system and method for performing halftone processing of color and monochrome data.

BACKGROUND OF THE INVENTION

Full color images, such as photographs, may contain an almost infinite range of color values. However, when printing a continuous tone image, such as a photograph, there is a limited number of colors available to recreate the image. As a result, in printing a continuous tone image, halftones are created. A common process for creating halftones is using a process called dithering, in which the density and pattern of color and/or black and white dots are varied to simulate different colors and different shades of gray. For a monochrome (black and white) image, areas of gray are created by varying the proportion of black and white dots or pixels, or by varying the dot size.

With respect to color, dithering approximates a color from a mixture of other colors when the required color is not available. Typically, the number of colors available is 256, such as seen in 8-bit GIF images. If a color does not correspond to one of the 256 available colors, the color is approximated from a mixture of two or more of the 256 available colors. The different colors can either be distributed randomly or regularly. Most images are dithered in a diffusion or randomized pattern to diminish any harsh transitions from one color to another color.

The dithering process differs for color and monochrome signals. Color signals are typically represented by multi-bit values, such as eight bits. In contrast, monochrome signals are typically represented as a single bit, meaning that a particular dot or pixel is either black or white. Because of the difference in bit size, halftone processors using a dithering process are not capable of outputting the color and monochrome signals simultaneously. As a result, it is not possible to output a color/monochrome pattern to one sheet of paper simultaneously.

Another halftone process that is commonly used is called error diffusion. Error diffusion works by thresholding each pixel value with a constant, and the difference between the pixel value and the constant is diffused to the neighboring pixels. More specifically, in a conventional error diffusion process, an algorithm calculates a quantization error for each pixel and feeds it forward to four unquantized pixels of an input image. The algorithm is equivalent to a feedback system that adds a weighted sum of four previous quantization errors to the current pixel before it is quantized. Since the weighting factors sum to one, the average value of the quantized image is locally equal to the true gray scale value, which yields images that are typically comparable or superior to most dithering techniques.

The output differs when applying error diffusion to monochrome data and to color data. In the conventional error diffusion process, the output for monochrome data is a single bit signifying that the pixel is either white or black. In contrast, the output for color data is a multi-bit value.

In addition to halftone processing, reproducing continuous tone images on displays and on printed paper typically uses gamma correction. Gamma correction controls the overall brightness of an image. Images which are not properly corrected can look either bleached out or too dark. Gamma correction of hardcopy devices, such as scanners, printers copier or multi-function peripherals, can be developed by analyzing a test pattern of a continuous tone image. As described above, however, it is not possible to output a color/monochrome pattern to one sheet of paper simultaneously. As a result, it is necessary to have separate test patterns for color and for monochrome.

SUMMARY OF THE INVENTION

According to one aspect of the invention, a system and method for creating gamma correction data for a hardcopy device includes generating a data pattern, the data pattern including data representing color pixels and monochrome pixels, dithering the color pixels of the data pattern, and error diffusing the monochrome pixels of the data pattern such that the dithered color pixels and the error diffused monochrome pixels are each N-bit values, N being greater than one. A test pattern is generated based on the dithered color pixels and the error diffused monochrome pixels. The test pattern is scanned into scanned image data, and a plurality of color gamma correction curves and a monochromatic gamma correction curve are generated from the scanned image data.

DETAILED DESCRIPTION OF THE PREFERRED EMBODIMENT

Figure 1:
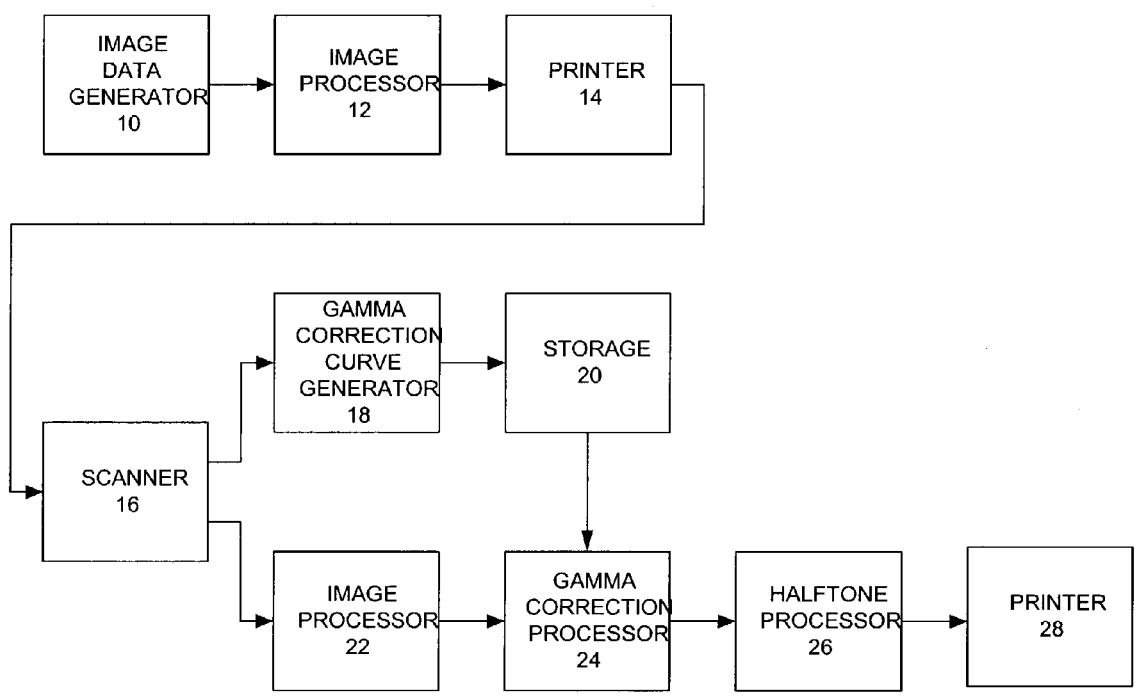
FIG. 1 is a block diagram of an image processing system consistent with the present invention.

FIG. 1 is a block diagram of an image processing system consistent with the present invention. As shown in FIG. 1, the image processing system includes an image data generator 10, an image processor 12, and a printer 14. The image processing system also includes a scanner 16, a gamma correction curve generator 18, a storage 20, an image processor 22, a gamma correction processor 24, a halftone processor 26, and a printer 28. All of the components of the image processing system can be part of a single image processing device, such as a printer, copier or multi-function peripheral. Alternatively, the components can be distributed among a plurality of image processing devices, or distributed among a combination of one or more image processing devices and one or more general processing devices, such as a workstation or server. The description and operation of each of the components of FIG. 1 is explained below in conjunction with FIGS. 2A and 2B.

Figure 2A:
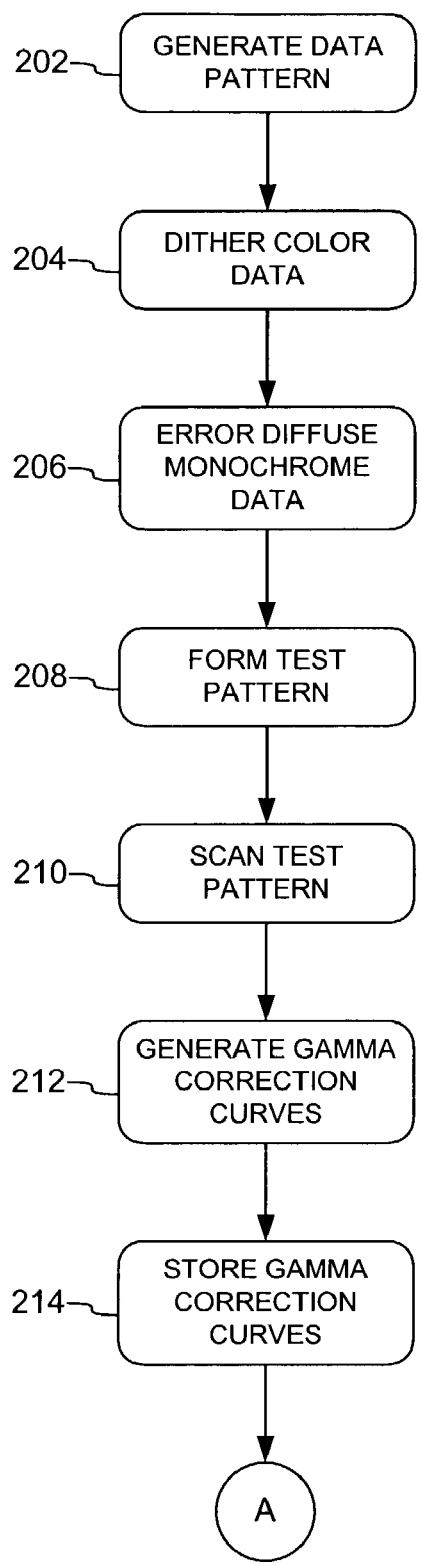
FIGS. 2A and 2B are flow diagrams for an image processing method consistent with the present invention.
Figure 2B:
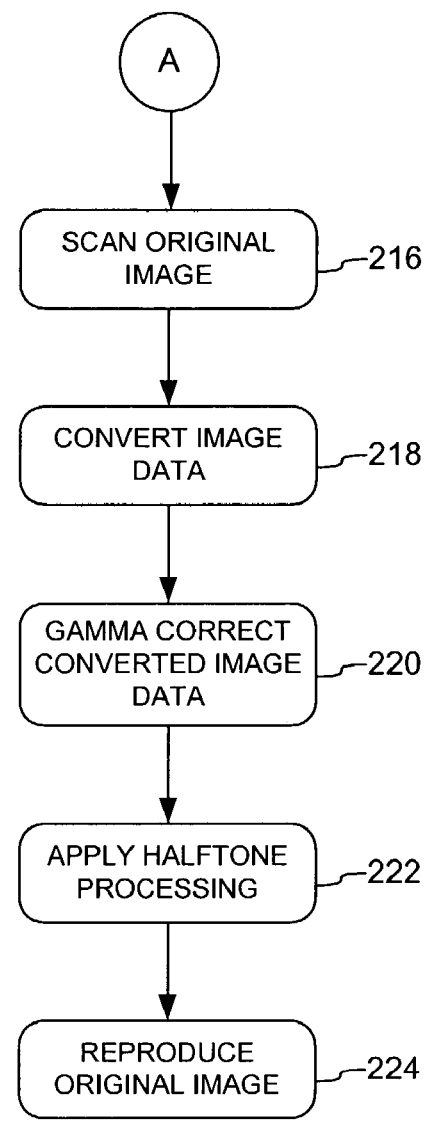

FIGS. 2A and 2B are flow diagrams for an image processing method consistent with the present invention. As shown in FIG. 2A, the image processing method first generates a data pattern (step 202). The data pattern is generated by the image data generator 10 and is used to form a test pattern, described below. The data pattern generated by the image data generator 10 includes both color pixels, which can also be referred to as color data, and monochromatic pixels, which can also be referred to as monochromatic data. The color pixels preferably includes both photographic ("photo") color pixels and text color pixels. The monochromatic pixels are typically photographic.

The data pattern can include a density value for each pixel of a test pattern to be formed. Alternatively, the data pattern can include information corresponding to a plurality of patches that form the test pattern. For each patch, the data pattern can include a unique identifier, such as a patch number, and a density value. Each patch can have a predetermined size, such as 379×255 pixels, although the patches can have a generic size of A×B, where A and B are both greater than one.

The density value of a patch corresponds to the density of a color or monochrome patch. For the color patches, the data pattern preferably includes density values for each color component—Y color patches, M color patches, C color patches and K color patches. In addition, if the data pattern includes both photo and text color pixels, then the color patches can include two sets of Y color patches, M color patches, C color patches and K color patches, one set for the photo color pixels and one set for the text color pixels. In a particular color patch, the density value corresponds to a particular color component. The density values are zero for the other color components of the particular color patch. For example, a pure Y color patch can have a density value of 16, and the M, C and K density values would be zero.

For the monochrome patches, it is possible for the data pattern to just have patch numbers and density values, as the monochromatic pixels do not have individual color components like the YMCK of the color pixels.

The color pixels of the data pattern are subject to a dithering process (step 204). The dithering process is performed by the image processor 12. As described above, the dithering process is a halftoning process used to prepare a continuous tone image for printing. Dithering processes in themselves are well known to one skilled in the art. It is also possible for the image processor 12 to apply a different halftoning process than the dithering process. If the data pattern includes patch information, then the density value for a color patch can be used to identify an applicable dithering pattern for that color patch. The dithering pattern preferably corresponds in size to the patch, although it is possible for the dithering pattern to be smaller or larger than the patch size. The identified dithering pattern can then be used to generate the patch of a particular color component (i.e., Y, M, C or K) that corresponds to the applicable density value.

In addition to dithering the color pixels, the monochrome pixels are subject to an error diffusion process (step 206). Like the dithering, the image processor 12 performs the error diffusion process. As described above, error diffusion works by thresholding each pixel value with a constant, and the difference between the pixel value and the constant is diffused to the neighboring pixels. In the conventional error diffusion process as outlined above, the output for monochrome data is a single bit signifying that the pixel is either white or black, whereas the output for color data is a multi-bit value, such as eight bits (representing 256 different density levels). As also described above, if after applying image processing to the color and monochromatic data, the color and monochromatic data have different bit sizes, it is not possible to reproduce the color and monochromatic data on the same sheet or paper.

To equalize the bit sizes of the image processed color data and monochromatic data, a modified error diffusion process is applied to the monochromatic data to produce image processed monochromatic data that has the same bit size as the image processed (e.g., dithered) color data. This modified error diffusion process, which can be referred to as pseudo error diffusion, can be performed by identifying an applicable error diffusion pattern. The applicable error diffusion pattern can be identified by reference to the density value of the monochromatic patch.

Figure 3:
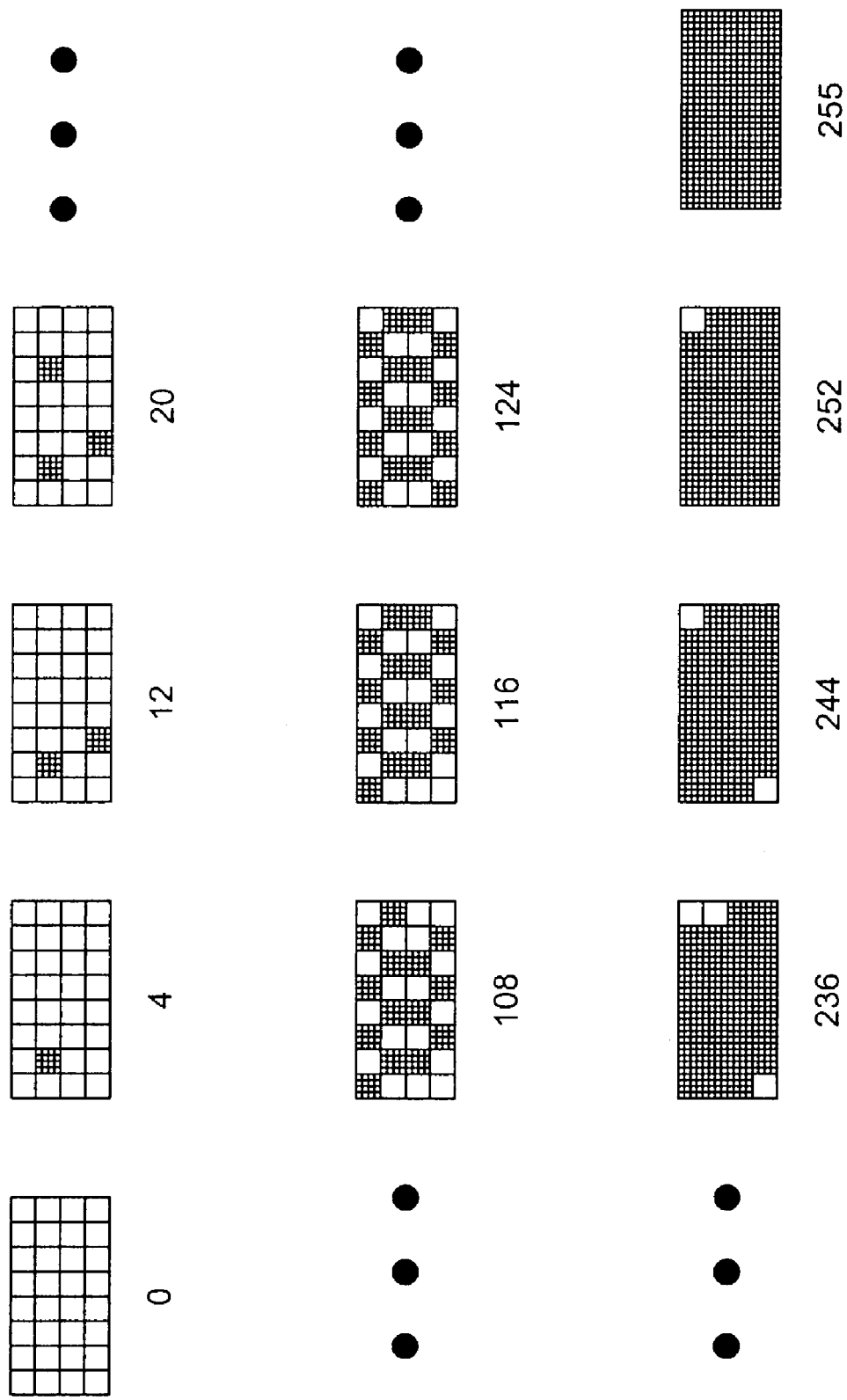
FIG. 3 is an exemplary graphical representation of error diffusion patterns consistent with the present invention.

FIG. 3 is an exemplary graphical representation of error diffusion patterns consistent with the present invention. The error diffusion patterns can be generated by using an error diffusion process which assumes that each pixel in the patch has the density value associated with the patch. The resulting pattern of black and white pixels would correspond to the black and white pixels in the error diffusion pattern. For example, if the density value corresponding to the patch is 124, then error diffusion would be applied with the assumption that each pixel of the patch has a density value of 124.

As shown in FIG. 3, there is a different error diffusion pattern for each different density value. The specific patterns shown in FIG. 3 are exemplary only. The error diffusion patterns shown in FIG. 3 can correspond to the size of a patch for forming the test pattern or some portion of the patch. In the error diffusion patterns shown, each box represents a single pixel, and each pattern has 32 pixels (4×8). It is also possible for the error diffusion patterns to have other sizes and total pixels. Although the size of the error diffusion pattern preferably corresponds to the size of the patch, it is possible for the error diffusion pattern to be smaller or larger than the patch.

Each empty box of an error diffusion pattern represents a white pixel, and each densely checkered box represents a black pixel. If, for example, the density value for the monochromatic patch is 20, then as shown in FIG. 3, the error diffusion pattern includes 29 white pixels and three black pixels. The value for each white pixel and black pixel of the error diffusion pattern has a bit size that corresponds to the bit size of the corresponding color data of the dithering patterns. If the bit size for the color data is, for example, eight bits, then each white pixel in the error diffusion pattern would be represented by eight zero bits (for a value of '0'), and each black pixel would be represented by eight one bits (for a value of '255').

When receiving the data pattern information from the image data generator 10, the image processor 12 is configured to distinguish each patch as being color or monochromatic data, and is also configured to distinguish the color data as photo color data or text color data. To distinguish between color and monochromatic data, the image processor can refer to the density value of the patch. For example, if the density value is eight or multiples of eight, then it is color data, and if the density value is four or multiples of eight plus four, then it is monochromatic data. To make the distinction between photo and text data, each patch can include an identifier or discrimination signal identifying the patch as either photo or text. For example, if the discrimination signal is zero, then it is photo data, and if the discrimination signal is one, then it is text data.

Once the dithering process has been carried out for the color data, and the error diffusion process have been carried out for the monochromatic data, the values in the patches are formed, where each patch is either color or monochromatic data, and the individual pixels in each patch have a particular value associated therewith (for example, an 8-bit value). The particular value for each individual pixel corresponds to a density value. These patches are then used to create the test pattern (step 208). The test pattern is preferably formed with the printer 14 on a sheet or paper, although other image reproduction devices can also be used. The printer 14 is capable of forming the test pattern with the both color and monochromatic data because the bit size is the same for the color and monochromatic data output from the image processor 12.

Thus, the test pattern can be formed using the identified dithering patterns for the color data and the identified error diffusion patterns for the monochromatic data. If the data pattern from the image data generator includes patch information, then the resulting test pattern includes a plurality of patches having different densities for the color data and for the monochromatic data.

Figure 4:
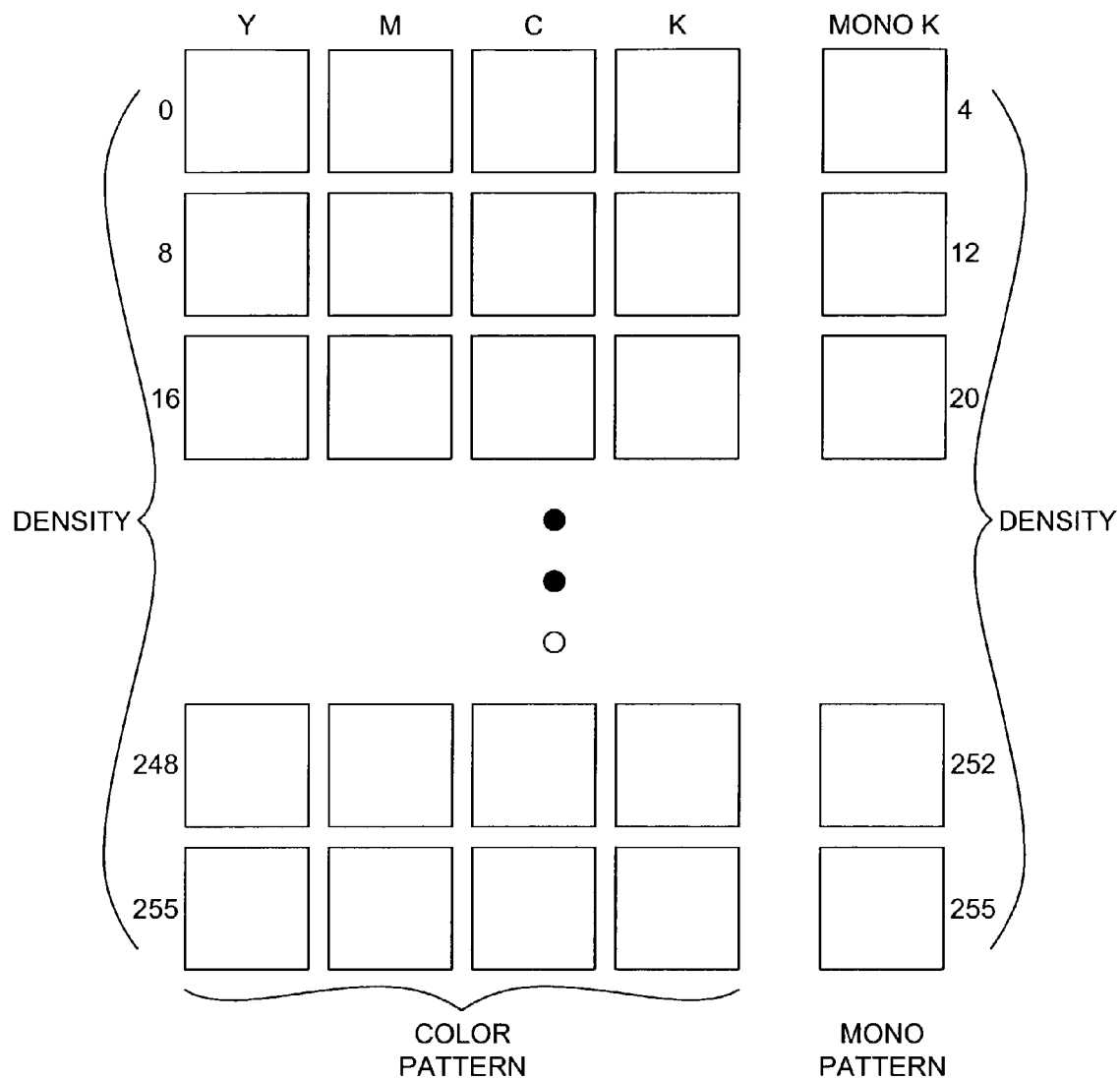
FIG. 4 is an exemplary graphical representation of a test pattern consistent with the present invention.

FIG. 4 is an exemplary graphical representation of a test pattern consistent with the present invention. As shown in FIG. 4, the test pattern includes a color pattern having YMCK color components and a monochromatic pattern. Each of the YMCK color components has patches corresponding to densities that are a multiple of eight. For example, the Y color component has patches with densities of 0, 8, 16, . . . , 248, and 255. The monochromatic pattern has patches corresponding to densities that are multiples of eight plus 4. As shown in FIG. 4, the densities for the patches in the monochromatic pattern can be 4, 12, 20, . . . , 252, and 255. The particular patch densities for the color and monochromatic data shown in FIG. 4 are merely exemplary as other density values can be used. In addition, the number of patches can be more or less than the number represented in FIG. 4. Further, although FIG. 4 shows one color pattern, the test pattern can include two color patterns as described above, one for text color data and one for photo color data. Having both of these color patterns results in nine patch patterns, four for each of the two color patterns (i.e., YMCK for text and YMCK for photo) and one for the monochromatic pattern.

The test pattern, such as one formed by the printer 14, is then scanned by the scanner 16 (step 210). The scanner 16 preferably includes a color CCD and a monochromatic CCD. The data generated by the color CCD is typically RGB data, although it is also possible for the color CCD to generate RGB data and K data. The monochromatic CCD generates monochromatic data only.

The scanned test pattern is used to generate gamma correction curves for the image processing system (step 212). The gamma correction curves are generated with the gamma correction curve generator 18. There are separate gamma correction curves for color data and for monochromatic data. For the color data, a separate gamma correction curve can be generated for each color component (YMCK). In addition, there can be separate gamma correction curves for text color data and photo color data. If the test pattern includes YMCK photo data, YMCK text data and monochromatic data, then nine gamma correction curves can be generated.

To generate a particular gamma correction curve, the gamma correction curve generator 18 can reference the data pattern generated by the image data generator 10. Referencing the data pattern enables the gamma correction curve generator 18 to identify the location of the patches and what type of data the patch represents. For example, to generate a gamma correction curve for Y text data, the gamma correction curve generator 18 can reference the data pattern to identify which patches correspond to Y text data. The gamma correction curve generator 18 then uses the RGB data generated by the scanner 16 that corresponds to the identified patches of the test pattern. To generate the monochromatic data, the gamma correction curve generator 18 uses the monochromatic data generated by the scanner 16 that corresponds to the monochromatic patches of the test pattern.

The generated gamma correction patterns are then stored (step 214). The generated gamma correction patterns can be stored in storage 20. Storage 20 is preferably a non-volatile storage medium, such as an NVRAM, an EPROM or hard disk drive. The generated gamma correction patterns stored in the storage 20 can be used for gamma correction of original images being reproduced, as described below.

As shown by the process of FIG. 2A, the gamma correction curves can be generated for color data and monochromatic data using a single test pattern (rather than needing separate test patterns for the color and monochromatic data). In addition, gamma correction curves can be generated for both text color data and photo color data from the single test pattern.

Having generated the gamma correction curves, original images having color and/or monochromatic data can be reproduced using the generated gamma correction curves to perform gamma correction. As shown in FIG. 2B, an original image is scanned (step 216). Like the test pattern, the original image can be scanned with scanner 16. The original image can be scanned with the color CCD or the monochromatic CCD. The particular CCD used can be determined by a mode selected by a user, or automatically by the image processing system. For example, a user can select to make a color or monochromatic copy of the original image. Alternatively, the scanner 16 of the image processing system can include an automatic color selection capability that uses a preliminary scan of the original image to determine if its color or monochromatic, and then scans the original image with the applicable CCD.

After scanning the original image, the image data generated by the scanner 16 is converted (step 218). The conversion can be performed by the image processor 22. The conversion by the image processor 22 can be, for example, to convert the RGB data to YMCK data. In addition, to conversion, the image processor 22 can perform other types of image processing on the image data generated by the scanner 16.

The converted image data is then gamma corrected (step 220). The gamma correction of the converted image data can be performed by the gamma correction processor 24. To perform the gamma correction, the gamma correction processor 24 identifies the application gamma correction pattern or patterns from the storage 20. The gamma correction processor 24 can determine which gamma correction pattern or patterns to use from the image data received by the image processor 22. In addition, if there are gamma correction patterns for photo color and text color, the gamma correction processor 24 can identify the applicable gamma correction patterns based on a user input identifying the mode as either a photo or text mode. Alternatively, a default of a photo or text mode can be used. It is also possible for the image processing system to be configured to automatically detect the appropriate mode.

Before reproducing the original image, halftone processing is applied to the gamma corrected image data (step 222). The halftone processing can be performed by the halftone processor 26. The halftone processing performed by the halftone processor 26 can generate a continuous tone image that can be reproduced. As described above, the halftone processing can be implemented by use of a dithering process, an error diffusion process or other halftone process known by those skilled in the art.

The original image is then reproduced from the halftone processed image data (step 224). The reproduction of the original can be performed by the printer 28. Alternatively, the reproduction of the original can be performed by other types of reproduction devices, such as in a copier or plotter. Although the printer 28 and the printer 14 are shown as separate components, it is possible for them to be implemented as a single printer or other reproduction device.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for creating gamma correction data for an image processing system, comprising:
   generating a data pattern, the data pattern including data representing color pixels and monochrome pixels;
   dithering the color pixels of the data pattern;
   error diffusing the monochrome pixels of the data pattern, wherein the dithered color pixels and the error diffused monochrome pixels are each N-bit values, N being greater than one;
   generating a test pattern based on the dithered color pixels and the error diffused monochrome pixels;
   scanning the test pattern into scanned image data; and
   generating a plurality of color gamma correction curves and a monochromatic gamma correction curve from the scanned image data.

2. A method according to claim 1, further comprising:
   scanning an original image; and
   applying the generated gamma correction curves to the scanned original image.

3. A method according to claim 2, further comprising reproducing the scanned original image after applying the generated gamma correction curves to the scanned original image.

4. A method according to claim 1, wherein the data pattern includes photo color pixels and text color pixels, the photo color pixels and the text color pixels each including YMCK data.

5. A method according to claim 4, wherein the color gamma correction curves include a gamma correction curve corresponding to each of the Y data, the M data, the C data, and the K data of the photo color pixels, and a gamma correction curve corresponding to each of the Y data, the M data, the C data and the K data of the text color pixels.

6. A method according to claim 1, wherein the data pattern includes a plurality of patches, each patch having a corresponding identifier and density value, and
   wherein each patch is a patch of color pixels or monochrome pixels.

7. A method according to claim 6, wherein each patch has a predetermined size of A×B pixels, where A and B are greater than one.

8. A method according to claim 6, wherein each patch corresponds to one of Y photo color pixels, M photo color pixels, C photo color pixels, K photo color pixels, Y text color pixels, M text color pixels, C text color pixels, K text color pixels, and monochrome pixels.

9. A method according to claim 8, wherein the step of dithering includes identifying a dither pattern for each patch of color pixels based on the identifier and the density value of the patch, and
   wherein the step of error diffusing includes identifying an error diffusion pattern for each patch of monochrome pixels based on the identifier and the density value of the patch.

10. A method according to claim 9, wherein the test pattern is generated from the identified dither patterns and error diffusion patterns.

11. A method according to claim 1, wherein the scanning comprises:
    reading the test pattern with a color CCD; and
    reading the test pattern with a monochromatic CCD.

12. A method according to claim 11, wherein the color gamma correction curves are generated from the test pattern read by the color CCD, and
    wherein the monochromatic gamma correction curve is generated from the test pattern read by the monochromatic CCD.

13. A method according to claim 12, wherein the test pattern includes photo color pixels and text color pixels, the method further comprising:
    determining the location of the photo color pixels and the text color pixels based on the data pattern; and
    generating gamma correction curves for the photo color pixels and gamma correction curves for the text color pixels in accordance with the determined locations of the photo color pixels and the text color pixels, respectively.

14. A method according to claim 1, where N is 8.

15. An image processing system for creating gamma correction data for a hardcopy device, comprising:
    an image data generator which generates a data pattern, the data pattern including data representing color pixels and monochrome pixels;
    an image processor configured to dither the color pixels of the data pattern and to error diffuse the monochrome pixels of the data pattern, wherein the dithered color pixels and the error diffused monochrome pixels are each N-bit values, N being greater than one;
    a hardcopy device which generates a test pattern based on the dithered color pixels and the error diffused monochrome pixels output from the image processor;
    a scanner which scans the test pattern into scanned image data; and
    a gamma correction curve generator configured to generate a plurality of color gamma correction curves and a monochromatic gamma correction curve from the scanned image data output from the scanner.

16. An image processing system according to claim 15, further comprising:
    a gamma correction processor which applies the generated gamma correction curves to image data of an original image scanned by the scanner.

17. An image processing system according to claim 16, wherein the hardcopy device reproduces the scanned original image after the application of the generated gamma correction curves by the gamma correction processor.

18. An image processing system according to claim 15, wherein the data pattern generated by the image data generator includes photo color pixels and text color pixels, the photo color pixels and the text color pixels each including YMCK data.

19. An image processing system according to claim 18, wherein the color gamma correction curves include a gamma correction curve corresponding to each of the Y data, the M data, the C data, and the K data of the photo color pixels, and a gamma correction curve corresponding to each of the Y data, the M data, the C data and the K data of the text color pixels.

20. An image processing system according to claim 15, wherein the data pattern generated by the image data generator includes a plurality of patches, each patch having a corresponding identifier and density value, and
    wherein each patch is a patch of color pixels or monochrome pixels.

21. An image processing system according to claim 20, wherein each patch has a predetermined size of A×B pixels, where A and B are greater than one.

22. An image processing system according to claim 20, wherein each patch corresponds to one of Y photo color pixels, M photo color pixels, C photo color pixels, K photo color pixels, Y text color pixels, M text color pixels, C text color pixels, K text color pixels, and monochrome pixels.

23. An image processing system according to claim 22, wherein the image processor is further configured to identify a dither pattern for each patch of color pixels based on the identifier and the density value of the data pattern, and to identify an error diffusion pattern for each patch of monochrome pixels based on the identifier and the density value of the data pattern.

24. An image processing system according to claim 23, wherein the test pattern is generated from the identified dither patterns and error diffusion patterns.

25. An image processing system according to claim 15, wherein the scanner comprises a color CCD and a monochromatic CCD, wherein the scanning of the test pattern by the scanner includes reading the test pattern with the color CCD and the monochromatic CCD.

26. An image processing system according to claim 25, wherein the color gamma correction curves are generated from the test pattern read by the color CCD, and
    wherein the monochromatic gamma correction curve is generated from the test pattern read by the monochromatic CCD.

27. An image processing system according to claim 26, wherein the test pattern includes photo color pixels and text color pixels, and
    wherein the gamma correction curve generator is further configured to determine the location of the photo color pixels and the text color pixels based on the data pattern, and to generate gamma correction curves for the photo color pixels and gamma correction curves for the text color pixels in accordance with the determined locations of the photo color pixels and the text color pixels, respectively.

28. An image processing system according to claim 15, where N is 8.

29. A method for creating gamma correction data for an image processing system, comprising:
    generating a data pattern, the data pattern including data representing color pixels and monochrome pixels;
    applying image processing to the color pixels of the data pattern and the monochrome pixels of the data pattern, wherein the image processed color pixels and monochrome pixels are each N-bit values, N being greater than one;
    generating a test pattern based on the image processed color pixels and monochrome pixels;
    scanning the test pattern into scanned image data; and
    generating a plurality of color gamma correction curves and a monochromatic gamma correction curve from the scanned image data.

30. An image processing system for creating gamma correction data for a hardcopy device, comprising:
    an image data generator which generates a data pattern, the data pattern including data representing color pixels and monochrome pixels;
    an image processor configured to apply image processing to the color pixels of the data pattern and to the monochrome pixels of the data pattern, wherein the image processed color pixels and the image processed monochrome pixels are each N-bit values, N being greater than one;
    a hardcopy device which generates a test pattern based on the image processed color pixels and the image processed monochrome pixels output from the image processor;
    a scanner which scans the test pattern into scanned image data; and
    a gamma correction curve generator configured to generate a plurality of color gamma correction curves and a monochromatic gamma correction curve from the scanned image data output from the scanner.

* * * * *